United States Patent [19]

Brown

[11] 4,446,196

[45] May 1, 1984

[54] HARD FACING COMPOSITION FOR IRON BASE ALLOY SUBSTRATE USING VC, W, MO, MN, NI AND CU AND PRODUCT

[75] Inventor: Harry J. Brown, Utica, N.Y.

[73] Assignee: Union Carbide Corporation, Danbury, Conn.

[21] Appl. No.: 393,227

[22] Filed: Jun. 28, 1982

[51] Int. Cl.³ .................. B32B 9/04; B32B 15/18; B22F 7/04

[52] U.S. Cl. ............................ 428/544; 428/558; 428/559; 428/560; 428/564; 428/565; 428/656; 428/939; 75/236; 75/241

[58] Field of Search ............ 428/564, 565, 558, 559, 428/560, 698, 679, 680, 681, 544, 656, 939; 75/236, 241; 419/15

[56] References Cited

U.S. PATENT DOCUMENTS

| | | | |
|---|---|---|---|
| 3,320,038 | 5/1967 | Scholz et al. | 419/15 X |
| 3,490,942 | 1/1970 | Lalieu et al. | 428/564 X |
| 3,807,968 | 4/1974 | Finaly et al. | 428/558 |
| 3,819,364 | 6/1974 | Frehn | 75/236 X |
| 3,859,057 | 1/1975 | Stoll et al. | 419/15 X |
| 3,986,842 | 10/1976 | Quaas | 428/559 |
| 4,011,054 | 3/1977 | Beyer et al. | 75/241 X |
| 4,055,742 | 10/1977 | Brown et al. | 219/145 |
| 4,122,238 | 10/1978 | Frantzerb, Sr. | 428/564 X |
| 4,162,392 | 7/1979 | Brown et al. | 219/146.51 |
| 4,177,324 | 12/1979 | Brown et al. | 428/627 |
| 4,224,382 | 9/1980 | Brown et al. | 428/656 |

Primary Examiner—Brooks H. Hunt
Assistant Examiner—Matthew A. Thexton
Attorney, Agent, or Firm—John R. Doherty

[57] ABSTRACT

Method for hard facing iron or iron base alloy substrates using as a hard facing material a solid composition consisting essentially of grains of vanadium carbide having in solid solution from about 10 to 50% by weight tungsten, and containing from about 0.5 to 5% by weight manganese and 0 to 3% by weight copper in the grain boundaries.

6 Claims, 1 Drawing Figure

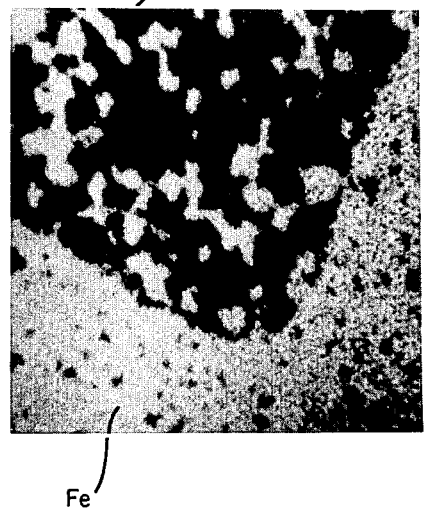

HARD FACING COMPOSITION FOR IRON BASE ALLOY SUBSTRATE USING VC, W, MO, MN, NI AND CU AND PRODUCT

DESCRIPTION

1. Technical Field

The present invention relates to the hard facing of iron base alloy substrates. More particularly, the present invention relates to the hard facing of iron base alloy substrates using a vanadium, tungsten, manganese, copper and carbon containing composition as the hard facing material. In one aspect, the present invention relates to the hard facing of iron base alloy substrates using such a hard facing material in two-sided welding applications.

2. Background Art

Hard facing of substrates, e.g., metal surfaces*, is a common industrial practice, for example, cast particulate tungsten carbide ($W_2C$-WC) or cobalt bonded WC, usually encased in a steel tube, is deposited by hard facing techniques on iron base alloys in making wear resistant cutters, earth moving equipment and the like. It has been found, however, that due possibly to the inherently different physical properties of base metal and tungsten carbide, the hard facing material has a tendency to become unevenly distributed in the molten portion of the metal substrate and as a result, undesired variations in hardness can occur in the resulting solidified hard-faced surfaces.

*The Oxy-Acetylene Handbook 11th Edition, Linde Air Products Division of Union Carbide Corporation, also Welding Handbook Third Edition, American Welding Society and Mechanized Surfacing With Alloy Materials—R. S. Zuchowski and J. H. Neely. ASM Review of Metal Literature 1958.

Also, during the deposition of both cast and cobalt-bonded tungsten carbide on iron and steel substrates, the molten iron in the substrate dissolves some of the tungsten carbide and upon cooling results in the precipitation of the mixed carbides $(FeW)_6C$ and $Fe_3W_3C$ according to the formula $3WC + 9Fe \rightarrow Fe_3W_3C + 2Fe_3C$, thus resulting in substantial depletion of the deposited tungsten into less wear resistant phase.

In instances where tungsten carbide is employed in hard facing, due to the high density of tungsten carbide, a relatively large weight of tungsten carbide is required for adequate hard facing.

U.S. Pat. Nos. 4,055,742; 4,162,392; 4,177,324; and 4,224,382 disclose the use of vanadium tungsten carbide solid solution in granular form for hard facing applications. During the application of this material by gas welding techniques (e.g., oxyacetylene welding), there has been a problem in achieving satisfactory two-sided weld deposits on iron base alloy substrates.

In two-sided gas welding, side one of the substrate is protected by a carburizing flame. Side two is unprotected and therefore quickly oxidizes. Deposits on side two are more difficult to achieve due to wetting and are generally slower and require more heat. On thin substrates, side one is reheated causing oxidation and shrinkage. Some of the vanadium tungsten carbide particles near the surface oxidize completely leaving macro holes in the weld deposit.

It is accordingly an object of the present invention to provide an improved method for hard facing an iron base alloy substrate using a material containing vanadium, tungsten and carbon in solid solution as the hard facing material.

Another object of the present invention is to provide such an improved hard facing method which avoids substantially all of the above noted problems heretofore encountered in two-sided welding applications.

DISCLOSURE OF THE INVENTION

The present invention is directed to an improvement in conventional methods of hard facing iron base alloy substrates which comprises employing as the hard facing material a solid material in the form of particles, e.g., granules consisting essentially of grains of chemically combined vanadium, tungsten and carbon, and containing a small amount of manganese alone or together with copper in the grain boundaries.

The aforesaid grains consist essentially of vanadium carbide having from about 10 to 50% by weight tungsten in solid solution. The vanadium carbide may be VC, $V_2C$, $V_4C_3$ or a mixture of such carbides. The manganese is employed in amounts of from about 0.5 to 5% by weight and preferably from about 1 to 3% by weight of the mixture. The copper particles may be used in the granular mixture as a fluxing component and may be added in proportions of from about 1 to 5% by weight of the mixture.

BRIEF DESCRIPTION OF THE DRAWING

The sole FIGURE in the accompanying drawing shows an electron microprobe for elemental iron (original magnification 400X) of VWC grain in a hard facing weld produced by the method of the present invention.

DETAILED DESCRIPTION

According to a specific embodiment of the present invention, a hard facing material for use in the hard facing method of the present invention comprises granules containing from about 54 to 59% by weight V, 20 to 25% by weight W, 12.5 to 14% by weight C and 1 to 4% by weight Mo in solid solution and also containing from about 0.5 to 5% by weight Mn, 1 to 5% by weight copper and 1 to 3% by weight nickel in the grain boundaries.

U.S. Pat. No. 4,177,324, supra, describes the hard facing of iron base alloy substrates using a hard facing grain comprising 96%($75VC_{0.925}WC$)—2%Ni-2%Mo. In essence, the present invention modifies this composition by the addition of manganese and copper. A preferred hard facing material in accordance with the present invention comprises 92%($75VC_{0.925}WC$)—2%Ni-2%MO-1%Mn and 3%Cu.

It has been found in accordance with the present invention that the addition of manganese to the VWC grain substantially changes the oxidation behavior of the solid solution granular material. When the VWC grain is exposed to the molten iron base alloy substrate, the grain ordinarily tends to oxidize and this oxidation inhibits wetting of the grain by the molten iron. The manganese addition fluxes the VWC or VC allowing the iron from the substrate, i.e., molten puddle, to penetrate the granules as they are breaking up in the molten puddle and prevents oxidation. Consequently the molten iron readily wets and flows easily throughout the granular structure. This is shown dramatically in the microprobe sample of the drawing. The sample composition is 91%($75VC_{0.925}WC$)—2%Ni, 2%Mo, 2%Mn, 3%Cu. The microprobe is taken for elemental iron, the presence of which is indicated by light areas in the probe. The dark area indicates the presence of VWC material at the interface between the substrate and hard facing material. This microprobe sample of an oxyacetylene weld deposit shows the presence of Mn and possibly Cu in the grain boundaries. This results in considerable amounts of iron wetting and defusing into the granule to form an oxidation resistant envelope.

The addition of copper particles in the hard facing material of the present invention serves to flux or wet the iron oxide scale that is produced on side two of the substrate during welding of side one. This fluxing or wetting action substantially lowers the time and temperature required to make the weld deposit.

While various techniques can be used for producing the above described hard facing material from conventional starting materials, including elemental vanadium, tungsten, manganese, copper, nickel, molybdenum and carbon, the preferred form of the hard facing material for use in the method of the present invention is a particulated cold pressed and sintered, e.g., under inert atmosphere, and subsequently granulated material illustrated by example in the specification. In the examples, the starting vanadium, tungsten, molybdenum, nickel, manganese, copper and carbon materials are blended, compacted and sintered under vacuum, e.g., about 100 microns at elevated temperatures, e.g., about 1200° to 1600° C. and for periods, e.g., ½ to 3 hours, sufficient to produce material as aforedescribed.

A particular embodiment of the present invention comprises a hard facing rod in conventional form for use in hard facing iron and iron base alloy substrates, e.g., mild steel, Hadfield steels, and the like. Such a hard facing rod comprises a metallic sheath or tube formed of the usual metals for such purposes such as iron, steel, aluminum, copper, and the like, containing therein hard facing composition as previously described.

The hard facing method of the present invention can be used with known gas and electric welding techniques, e.g., gas welding, arc welding and other practices described in the "Master Chart of Welding Processes"—American Welding Society (1969) using conventional fluxes. However, the present invention is most preferably employed in two-sided gas welding applications.

The hard facing method of the present invention can also be used with known plasma flame spraying or coating techniques such as disclosed in "Flame Spray Handbook" Vol. III METCO INC. (1965).

It should also be noted that the hard facing method of the present invention is preferably carried out using flux compositions containing nickel boron (NiB) or calcium silicon (CaSi) as disclosed and claimed in the co-pending application of H. J. Brown, Ser. No. 393,226, filed on even date herewith and assigned to the same assignee as the present invention.

A particularly advantageous embodiment of the present invention are those hard facing practices which involve the forming of a puddle of molten iron base alloy, e.g., steel on a substrate, and the dropping of particles, i.e., granules of hard facing material into the puddle, e.g., sized about 12 to 80 mesh to provide, such solidification of the puddle, a hard facing deposit comprising a steel matrix with particles of the hard facing material of the present invention uniformly distributed and bonded therein. Examples of such practices are "bulk" TIG (tungsten inert gas) and MIG (metal inert gas) techniques wherein the hard facing material is dropped into a smaller metal puddle.

In the hard facing of metal substrates in accordance with the present invention by the above-noted conventional techniques, the metal substrate and the applied hard facing material become metallurgically bonded.

The resulting hard facing deposit is a matrix of iron base alloy, e.g., steel, in which particles of the hard facing material of the present invention are embedded by metallurgical bonding.

The following examples will further illustrate the practice of the present invention;

EXAMPLE I

The following materials were used to obtain a cold pressed, sintered hard facing composition containing about 56% by weight V, 22% by weight W, 2% by weight Mo, 2% by weight Ni, 2% by weight Mn, and 13.5% by weight C:

(A) 980 g of a balled milled powdery material containing vanadium, tungsten, carbon, nickel and molybdenum, prepared from:
 (i) 521.5 lbs. of a commercially available material (Union Carbide Corporation) containing mixed $V_2C+VC$, sized 65 mesh and finer having the following analysis:
 85.42% V
 13.02% C
 0.75% O
 Balance moisture and incidental impurities.
 (ii) 40.5 lbs. Acheson* brand G39 graphite powder, sized 200 mesh and finer.
 *Trademarks of Union Carbide Corp.
 (iii) 169 lbs. of UCAR* tungsten metal powder (2.2 microns).
 *Trademarks of Union Carbide Corp.
 (iv) 15 lbs. of nickel powder, extra fine grade from INCO.
 (v) 15 lbs. of molybdenum metal powder, sized 4 micron.

(B) 20 g of manganese metal, sized 325 mesh and finer.

The powders were placed in a 2 quart capacity steel ball mill with 10¼ lbs. of ½ inch dia. steel balls and turned at 100-110 RPM for 16 hours. After 16 hours milling, the material was cold pressed in a roll compactor and the cold pressed material was crushed into granules sized 30×60 mesh. The granules were placed in graphite boats and sintered in a tube furnace under vacuum at 1400° C. for 4 hrs. After sintering the granules were lightly bonded together but were easily separated in a jaw crusher. The resulting material was formed of granules containing grains of chemically combined vanadium, tungsten, molybdenum, and carbon; the grains being bonded to each other by a predominantly nickel-molybdenum-manganese alloy. The material was essentially 94%(75VC$_{0.925}$WC)—2%Ni, 2%Mo, 2%Mn.

Cold pressed and sintered material prepared by the above procedure was employed as a hard facing material in the following manner:

Granules 30×80 mesh were packed into 13 inch long 3/16 inch OD mild steel tubing. The granules comprised about 35% by weight of the rod. The rod was fluxed for oxyacetylene welding using a ferro boron containing flux composition and deposited by oxyacetylene techniques with a minimum of penetration on one side (Side One) of a mild steel substrate with a carborizing flame. After the deposit and substrate had cooled to room temperature, the substrate was turned over to expose its other side (Side Two) and a second deposit was made using the same rod under the same conditions. Visual observations were made during the welding procedure to determine the fluidity and wetting characteristics of the hard facing material and also, after the weld deposits had cooled, to determine the condition of the welds, i.e., amount of scale, oxidation, shrinkage, etc. The results of the tests are given in Table A below.

It will be noted from Table A that this particular hard facing material containing about 2% by weight Mn exhibited good wetting properties and resulted in an acceptable surface deposit. However, the hard facing material did not wet as well when the material was applied to Side Two.

EXAMPLE II

A cold pressed, sintered hard facing composition containing vanadium, tungsten, molybdenum, nickel, manganese and carbon was prepared using the same amounts of each ingredient as specified in Example I except that the amount of manganese employed was increased to about 5% by weight. The powders were milled, compressed and sintered in the same manner as described in the previous Example except that, in this case, the crushed granules (sized 30-80 mesh) were sintered in a vacuum at a temperature of about 1260° C. for 4 hrs. The resulting material was formed of granules containing grains of chemically combined vanadium, tungsten, molybdenum, and carbon, the grains being bonded to each other by a predominantly nickel-molybdenum-manganese alloy. The material was essentially 91%(75VC$_{0.9}$25WC)—2%Ni, 2%Mo, 5%Mn.

Cold pressed and sintered material prepared in this example was employed as a hard facing material in the same manner as described in Example I, i.e., the granules 30×80 mesh were packed into 13 inch long 3/16 inch OD mild steel tubing. Again, the rod was fluxed for oxyacetylene welding using a ferro boron containing flux composition. The rod was deposited by oxyacetylene techniques onto Side One of a mild steel substrate with a minimum of penetration, followed by depositing the same hard facing material onto Side Two of the substrate after cooling. The same visual observations were made and recorded. The results are also given in Table A below.

It will be noted from Table A that the hard facing material of this example containing about 5%Mn exhibited good wetting properties on both Side One and Two but that the resulting weld deposits did show some shrinkage.

EXAMPLE III

The following materials were used to obtain cold pressed, sintered hard facing composition containing about 55% by weight V, 21.5% by weight W, 2.0% by weight Mo, 2.0% by weight Ni, 1.0% by weight Mn, 3.0% by weight Cu and 13.2% by weight C:

(A) 960 g of a ball milled powdery material containing vanadium, tungsten, carbon, nickel and molybdenum prepared from:
  (i) 521.5 lbs. of a commercially available material (Union Carbide Corporation) containing mixed V$_2$C+VC, sized 65 mesh and finer having the following analysis:
   85.42% V
   13.02% C
   0.75% O
   Balance moisture and incidental impurities.
  (ii) 40.5 lbs Acheson* brand G39 graphite powder, sized 200 mesh and finer.

* Trademarks of Union Carbide Corp.

(iii) 169 lbs. of UCAR* tungsten metal powder (2.2 micron).

* Trademarks of Union Carbide Corp.

(iv) 15 lbs of nickel powder, extra fine grade, from INCO.
  (v) 15 lbs. of molybdenum metal powder, sized 4 micron.
(B) 10 g of manganese metal powder, sized 325 mesh and finer.
(C) 30 g of copper powder sized 100 mesh and finer.

The powders were placed in a 2 quart capacity steel ball mill with 10¼ lbs. of ½ inch dia. steel balls and turned at 100-110 RPM for 16 hours. After 16 hours milling, the material was cold pressed in a roll compactor and the cold pressed material was crushed into granules sized 30×60 mesh. The granules were placed in graphite boats and sintered in a tube furnace under an argon atmosphere at 1400° C. for 4 hrs. After sintering the granules were lightly bonded together but were easily separated in a jaw crusher. The resulting material was formed into granules containing grains of chemically combined vanadium, tungsten, molybdenum, and carbon; the grains being bonded to each other by a predominantly nickel-molybdenum-manganese alloy. The material was essentially 92%(75VC$_{0.925}$WC)—2%Ni, 2%Mo, 1%Mn, 3%Cu.

Cold pressed and sintered material prepared following the above procedure was employed as a hard facing material in the following manner:

Granules 30×80 mesh were packed into 13 inch long 3/16 inch OD mild steel tubing. The granules comprised about 38% by weight of the rod. The rod was fluxed for oxyacetylene welding using a ferro boron containing flux composition and deposited by oxyacetylene techniques with a minimum of penetration on one side (Side One) of a mild steel substrate with a carborizing flame. After the deposit and substrate had cooled to room temperature, the substrate was turned over to expose its other side (Side Two) and a second deposit was made using the same rod under the same conditions. Visual observations were made during the welding procedure to determine the fluidity and wetting characteristics of the hard facing material and also, after the weld deposits had cooled, to determine the condition of the welds, i.e., amount of scale, oxidation, shrinkage, etc. The results of the tests are given in Table A below.

It will be noted from Table A that the hard facing material of this example containing about 1% by weight Mn, and 3% by weight Cu, exhibited good wetting properties on both Side One and Side Two. The resulting deposit showed no evidence of shrinkage.

TABLE A

Flow and Wetting Characteristics of Hard Facing Materials Containing V, W, C, Ni, Mo, Mn and Cu

| Example No. | Composition | Visual Observation | |
|---|---|---|---|
| 1 | 94% (75VC$_{0.9}$, 25WC) 2% Ni, 2% Mo, 2% Mn | Side One: | Good wetting, good surface |
| | | Side Two: | Not wetting as well |
| 2 | 91% (75VC$_{0.9}$, 25WC) 2% Ni, 2% Mo, 5% Mn | Side One: | Good wetting, shrinkage |
| | | Side Two: | Fluidity good, shrinkage |
| 3 | 92% (75VC$_{0.9}$, 25WC) 2% Ni, 2% Mo, 1% Mn, 3% Cu | Side One: | Good wetting, good surface |
| | | Side Two: | Wetting fairly well, no |

TABLE A-continued

Flow and Wetting Characteristics of Hard Facing
Materials Containing V, W, C, Ni, Mo, Mn and Cu

| Example No. | Composition | Visual Observation |
| --- | --- | --- |
| | | shrinkage |

I claim:

1. In a method for hard facing a surface of an iron or iron base alloy substrate by forming a bond between said surface and a hard facing material, the improvement which comprises employing as a hard facing material a composition consisting essentially of grains of vanadium carbide having in solid solution from about 10 to 50% by weight tungsten and from about 1 to 4% by weight molybdenum, and containing from about 0.5 to 5% by weight manganese, from about 1 to 3% by weight nickel and from about 1 to 5% by weight copper in the grain boundaries.

2. A method according to claim 1 in which said hard facing composition contains from about 1 to 3% by weight manganese in the grain boundaries.

3. A method according to claim 1 in which said hard facing composition is in particulated form.

4. A method according to claim 1 in which said hard facing composition is a sintered material in particulated form.

5. A hard faced metal surface formed by providing molten iron or iron base alloy on a portion of iron or iron base alloy metal substrate, applying to the molten metal a solid composition consisting essentially of grains of vanadium carbide having in solid solution from about 10 to 50% by weight tungsten and from about 1 to 4% by weight molybdenum, and containing from about 0.5 to 5% by weight manganese, from about 1 to 3% by weight nickel and from about 1 to 5% by weight copper in the grain boundaries.

6. A hard facing rod comprising a metal sheath consisting essentially of a material selected from the group consisting of iron, steel, aluminum and copper and containing a hard facing composition consisting essentially of grains of vanadium carbide having in solid solution from about 10 to 50% by weight tungsten and from about 1 to 4% by weight molybdenum, and containing from about 0.5 to 5% by weight manganese, from about 1 to 3% by weight nickel and from about 1 to 5% by weight copper in the grain boundaries.

* * * * *

UNITED STATES PATENT AND TRADEMARK OFFICE
CERTIFICATE OF CORRECTION

PATENT NO. : 4,446,196
DATED : May 1, 1984
INVENTOR(S) : Harry James Brown

It is certified that error appears in the above-identified patent and that said Letters Patent is hereby corrected as shown below:

Col. 2, line 48, at beginning of line - "2% MO" should be "2% Mo".

Col. 3, line 59, at end of line - "such" should be "upon".

Signed and Sealed this

Twenty-first Day of August 1984

[SEAL]

Attest:

GERALD J. MOSSINGHOFF

Attesting Officer       Commissioner of Patents and Trademarks